(12) United States Patent
Vasil'Yeva et al.

(10) Patent No.: US 11,213,812 B2
(45) Date of Patent: Jan. 4, 2022

(54) HYBRID SORBENT

(71) Applicant: ELECTROPHOR, INC., Woodmere, NY (US)

(72) Inventors: Evgeniya Sergeyevna Vasil'Yeva, Saint-Petersburg (RU); Aleksandr Gennadievich Mitilineos, Saint-Petersburg (RU); Yuriy Evgenievich Kazakevich, Saint-Petersburg (RU); Iuliia Anatolievna Remizova, Kudrovo (RU)

(*) Notice: Subject to any disclaimer, the term of this patent is extended or adjusted under 35 U.S.C. 154(b) by 0 days.

(21) Appl. No.: 16/631,478

(22) PCT Filed: Jun. 9, 2018

(86) PCT No.: PCT/RU2018/000386
§ 371 (c)(1),
(2) Date: Jan. 27, 2020

(87) PCT Pub. No.: WO2019/017816
PCT Pub. Date: Jan. 24, 2019

(65) Prior Publication Data
US 2020/0206725 A1   Jul. 2, 2020

(30) Foreign Application Priority Data
Jul. 17, 2017   (RU) ................................. 2017125453

(51) Int. Cl.
*B01J 47/014* (2017.01)
*B01J 47/127* (2017.01)
(Continued)

(52) U.S. Cl.
CPC ............. *B01J 47/014* (2017.01); *B01J 20/06* (2013.01); *B01J 20/28007* (2013.01);
(Continued)

(58) Field of Classification Search
CPC ........ B01J 47/014; B01J 47/127; B01J 20/06; B01J 20/28007; B01J 20/28026;
(Continued)

(56) References Cited

U.S. PATENT DOCUMENTS 7,291,578 B2 * 11/2007 SenGupta ................ B01J 20/06
                                                         210/683
7,407,587 B1   8/2008 Moller
(Continued)

OTHER PUBLICATIONS

Melnikov I. O et. al Selektivnoe isvlechenie mysh'yaka iz vodnih rastvorov s primeneniem hibridnyh sorbentov [Selective removal of arsenic from water solutions], Voda: himiiay and ecologiay, 12 (65), 2013, str 72-78 [Water: chemistry and ecology].
(Continued)

*Primary Examiner* — Andrew J. Oyer
(74) *Attorney, Agent, or Firm* — Anna Vishev

(57) ABSTRACT

Hybrid sorbent on the base of anion-exchange polymeric matrix with HFO for selective sorption of arsenic characterized in that, HFO exists in matrix as particles, which at most are amorphous ferrihydrite, fraction of which is not less than 80%, preferably more than 90% from total mass of HFO.
The object of the invention and the technical result achieved with the use of the invention is to develop new hybrid sorbent with HFO with increased sorption kinetics of two arsenic forms As(III) and As(V) simultaneously.

5 Claims, 5 Drawing Sheets

1a

1b (51) Int. Cl.
  *B01J 20/06*   (2006.01)
  *B01J 20/28*   (2006.01)
  *B01J 41/04*   (2017.01)
  *B01J 41/14*   (2006.01)
  *C02F 1/42*    (2006.01)
  *C02F 101/10*  (2006.01)

(52) U.S. Cl.
  CPC ..... *B01J 20/2808* (2013.01); *B01J 20/28026* (2013.01); *B01J 41/04* (2013.01); *B01J 41/14* (2013.01); *B01J 47/127* (2017.01); *C02F 1/42* (2013.01); *C02F 2001/422* (2013.01); *C02F 2101/103* (2013.01)

(58) Field of Classification Search
  CPC ........ B01J 20/2808; B01J 41/04; B01J 41/14; B01J 20/0229; B01J 20/26; C02F 1/42; C02F 2001/422; C02F 2101/103
  See application file for complete search history.

(56) References Cited

U.S. PATENT DOCUMENTS

| | | |
|---|---|---|
| 7,807,606 B2 | 10/2010 | Tranter et al. |
| 9,120,093 B2 | 9/2015 | SenGupta et al. |
| 2006/0237371 A1 | 10/2006 | Sylvester et al. |
| 2008/0035564 A1 | 2/2008 | Moller et al. |
| 2017/0240435 A1* | 8/2017 | Chen .............. B01J 20/3425 |

OTHER PUBLICATIONS

Lubentsova K. I. Polychenie i issledovanie pfisiko-himicheskih svoistv compositnyh sorbentov na osnove polistirol'nyh matriz s nanodispersnymi oksidami zheleza [Production and research of physico chemical properties of composite sorbents on the base of polystyrene matrixes with nano disperse ferric oxides] Dissertazia na soiskanie uchenoj stepeni kandidata himicheskih nauk Moscva, Mar. 2016, glava 2.2-2.3 [thesis for Ph.D. thesis in Chemical Science, Moscow, Mar. 2016, chapter 2.2-2.3].

* cited by examiner

HYBRID SORBENT

The invention is from the filed of hybrid sorbents for removal of arsenic compounds from water and is intended for water purification device.

In many countries due to the lack of surface water sources they use ground waters instead. When ground waters are used as the source of water there is a problem of arsenic contamination which is typical for about 20 countries, for example USA and Chili. On the territory of Russia there are several regions where ground waters contain arsenic, for example Transbaical, Stavrapol, Perm, Khabarovsk, republic of Tuva, Magadan and Pensa region and also republic of Daghestan. Arsenic, containing in water leads to development of cancer and to dermatophytid. In water arsenic contains as arsenous compound (further—As(III)), for example, arsenites and arsenous acid and arsenic compound (further—As(V)), for example, arsenates. From the state of the art sorbents for dearsenication are known. The material containing of ferric oxides, ferric hydroxides and oxyhydroxides in different ratio is frequently used (further—HFO). According to components ratio different variants of HFO with different properties are known.

Sorbents from the state of the art are produced when HFO particles are distributed in inert polymeric material or in polymeric material containing ion exchange groups for iron ions fixation. HFO addition into polymeric material is made, for example, by mechanic dispersion of HFO particles in material or by creation of HFO particles directly in polymeric material through the formation of intermediate structure in material with further HFO particles sedimentation Such kind of sorbents are called hybrid sorbents.

Hybrid sorbent for arsenic removal according to the U.S. Pat. No. 4,576,969 (publishes 18 Mar. 1986, priority date 13 Oct. 1983, InC C08D 5/20, C08F 8/10, applicant Unitika Ltd (Japan)) is known from the state of the art. Hybrid sorbent is ion exchange phenolic resin with metal oxide fixed in its structure. The hybrid sorbent is produced in the following way. On the first stage the phenolic resin precondensation is done. While the resin is still in viscous flow state salt or metal oxide is added to it, for example sulphate, hypochlorite, nitrate, acetate, of ferrum, aluminium, zinc and etc. Then the condensation reaction takes place to fix oxide or metal salt in resin structure. For example carbon tetrachloride, chloroform or dichloromethane can be used as a reaction medium. After the condensation the derived material is separated form the media and then the alkylating material is added, for example, alkali hydroxide or sodium carbonate. Structure of derived hybrid sorbent is crosslinked phenolic resin with polyvalent metal hydroxide fixed inside. Sorbent has low swelling degree, high durability, sorbent granules has very few cracks and hardly deform.

According to the U.S. Pat. No. 4,576,969 sorption capacity of the derived hybrid sorbent of the arsenic is 33 mg/g at very low water flow velocity through the material (250 ml/h), and that is very ineffective. Such low velocity may be explained that this derived hybrid sorbent has ultradense structure, which complicates the water flow. Low water flow velocity through the sorbent significantly narrows its field of utilization only to laboratory experiments; as such velocity value is not suitable in industry scale. As phenol and formalin are used during hybrid sorbent production, so it can not be used for drinking water production. Even residual content of these two agents in the resin can be washed into the filtering water while it flows through the layer of sorbent and this is forbidden for drinking water.

Hybrid sorbent for arsenic removal according to the patent application US 2011/0056887 (published 10 Mar. 2011, priority date 8 Sep. 2009, InC C02F 1/42, C02F 103/06, C02F 103/02, C02F 103/10, C02F 101/10, applicant LANXESS DEUTSCHLAND GMBH (DE); LANXESS CORPORATION (US)) is known from the state of the art. Hybrid sorbent is macroporous monodisperse anion exchange material with HFO spread on it. The sorbent is intended mostly for removal of arsenic such as $H_2AsO_4^-$, $H_2AsO_4^-$, $HAsO_3^{2-}$, $AsO_4^{3-}$, $H_3AsO_3$, $H_2AsO_3^-$, $HAsO_4^{2-}$, $HAsO_4^{2-}$ from water and water solutions. The iron (III) content in sorbent is 16% (mass).

HFO is spread on the anion exchange material in the following way. At room temperature and constant stirring the deionized water is added to the anion exchange material. After that iron sulphate (III) is added to the derived suspension and the stirring continues for 90 minutes. After that the water solution of sodium hydroxide is added to the mixture till the pH of it reaches 7. Then water solution of sodium chloride is added to the derived mixture and the stirring continues for 30 minutes. Solid phase is separated from the suspension and this solid state is the final product.

The hybrid sorbent according to the application US 2011/0056887 has low sorption capacity to arsenic ions As(III) и As(V), so the hybrid sorbent can be used for water and water solutions where the arsenic concentration is no more then 10 mg(As)/l.

Hybrid sorbent for arsenic removal according to the U.S. Pat. No. 7,811,360 (published. 12 Dec. 2010, priority. 25 Sep. 2001, InC B01D 53/04, applicant LANXESS Deutschland GmbH (DE)), is known from the state of the art. The sorbent consists of HFO, in particular of oxihydroxide goethite $\alpha$-FeO(OH), in elongated granules or short fibers.

Three variants of sorbent are given in this patent: sorbent 1, sorbent 2 and sorbent 3 and three methods of their production respectively.

Sorbent 1 consists of 100% geothite $\alpha$-FeO(OH) and is in the form of agglomerates of short elastic fibers with diameter 30-50 nm and length from 0.2 to 2 mm with high mechanical properties, resistant to compaction, hydraulic tension and wear and tear.

Sorbent 1 is produced by the following method. Ferrous sulphate (II) $FeSO_4$ is dissolved in water and derived solution is cooled to 14° C. Then magnesium sulphate $MgSO_4 \cdot 7H_2O$ is added to the derived solution. The solution is homogenized at solution temperature 14° C. Then sodium hydroxide is added to the solution and is oxidized by air oxygen bubbling till the precipitation takes place, the sediment contains 99.5% geothite. The sediment is decanted and pressed. The sediment mass is pressed on metal presses with 7 mm holes to form elongated granules or short fibers of final sorbent. Sorbent fibers are dried on belt drier to residual moisture 3%.

Sorbent 2 consists of geothite $\alpha$-FeO(OH) and magnesium hydroxide $Mg(OH)_2$. Sorbent consists of short fibers, grouped into agglomerates, fibers are connected with each other by amorphous layers.

Sorbent 2 is produced by the following method. 50 g/l of suspension containing HFO hydroxide-geothite $\alpha$-FeO(OH) is added to $MgSO_4$ water solution. After that sodium hydroxide is added to the solution under continues stirring for 15 minutes. Suspension is rinsed on nutsch filter till specific conductivity of the solution reaches 1 mSm/sm, the sediment is dried in desiccator at 75° C. to residual moisture 3%.

Sorbent 3 is 100% geothite α-FeO(OH) in the form of very short needle-shaped crystals gathered in dense agglomerates. Specific surface area is 102 m²/g.

Sorbent 3 is produced by mixing of aluminium sulphate $Al_2(SO_4)_3$ solution with geothite α-FeO(OH) in sodium hydroxide solution with further sediment decanting, further rinsing and drying of the sorbent to residual moisture not more than 2%. The size of needle-shaped crystals is from 0.5 to 2 mm.

The main drawback of sorbent of a U.S. Pat. No. 7,811,360 is low degree of arsenic As(III) and As(V) removal—not more than 50% for each arsenic type and low arsenic As(III) H As(V) kinetic of sorption.

Kinetic of Sorption of Sorbent 1:
As(III) for example $NaAsO_2$ concentration 2.5 mg/l is 1.8 mg($As^{3+}$)/g(FeO(OH))·h;
As(V) for example $Na_2HAsO_4$ concentration 2.9 mg/l is 1.5 мГ($As^{5+}$)/g(FeO(OH))·h.

Kinetic of Sorption of Sorbent 2:
As(III) of $NaAsO_2$ concentration 2.6 mg/l is 1.2 mg($As^{3+}$)/g(FeO(OH))·h;
As(V) of $Na_2HAsO_4$ concentration 2.7 mg/l is 1.5 mg($As^{5+}$)/g(FeO(OH))·h.

Kinetic of Sorption of Sorbent 3:
As(III) of $NaAsO_2$ concentration 2.6 mg/l is 2.0 mg($As^{3+}$)/g(FeO(OH))·h;
As(V) of $Na_2HAsO_4$ concentration 2.1 mg/l составляет 1.5 mg($As^{5+}$)/g(FeO(OH))·h.

So the sorbent is not enough effective for arsenic ions As(III) and As(V) removal.

Hybrid sorbent for arsenic removal according to the U.S. Pat. No. 7,807,606 (published 5 Oct. 2010, priory date 4 Sep. 2003, InC B01J 21/04, assignee Battelle Energy Alliance, LLC (US)) is known from the state of the art. Hybrid sorbent is a polymeric matrix with HFO spread on it. Polyacrylonitrile (further—PAN)—homoplymer of acrylonitrile or co-polymer, containing at least 40% of acrylonitrile units is used as a polymeric matrix. U.S. Pat. No. 7,807,606 is about hybrid sorbent and two methods of its production.

In the first method of HFO production ferric oxide $Fe_3O_4$ or $Fe_2O_3$ is dissolved in concentrated nitric acid. After that PAN is added to the solution, till its content is from 3 to 5% then the solution is stirred. Than the derived solution is spread through air nozzles into sodium hydroxide solution. When drops of solution flow into the alkali, they immediately set solid, and solid granules of sorbent are formed. Solid granules of derived sorbent are taken out of alkali bath, rinsed with ethanol and dried at temperature about 60° C. After it granules are crushed into homogeneous fraction of granulated sorbent. Derived sorbent may contain from 30% to 70% of iorn (III).

According to the second method HFO is dissolved in dimethyl sulfoxide (further DMSO), and after all HFO particles are totally dissolved, PAN is added to the solution. Ratio of PAN:HFO is about 1:5, respectively. The dissolving of PAN is done at 90° C. and constant stirring till all PAN fibers are dissolved. After that the temperature is gradually to decreased 40° C. Then solution is spread through air nozzles into the bath with cold deionized water. When spread solution particles of PAN with HFO in DMSO, DMSO goes from the solution into the deionized water and solid granules of hybrid sorbent are formed. After it derived solid particles of the sorbent are additionally rinsed with water under continuous stirring within 30 minutes in order to remove residual DMSO. Then derived sorbent granules are dried under 40° C. The derived granulated sorbent with HFO contains approximately 85% HFO and 15% PAN.

Sorbent granules have macroporous structure and good mechanical properties.

Hybrid sorbent derived according to both methods may contain form 10 to 85% HFO and from 10 to 90% PAN of total weight of the sorbent. HFO in hybrid sorbent is in the form of iron (III) in elementary form, iron hydroxide, iron oxihydroxes and iron oxides. General content of iron in hybrid sorbent may be from 250 to 700 mg/g.

Sorption capacity of hybrid sorbent of As(V) is from 7.5 to 10 mg/g.

The hybrid sorbent of the U.S. Pat. No. 7,807,606 has the following drawbacks. First of all it is low sorption capacity of As(V), and also the absence of the evidence of the claimed sorption capacity of As(III) ions. The above mentioned HFO compounds have crystal structure and so their sorption capacity is low.

Significant drawback of the hybrid sorbent, derived by the method described in the patent, is the dissolution of PAN, as because of it PAN fiber looses its regularized structure and properties. Also PAN in the form of fiber to dissolve it into liquid phase to form granules afterwards is not practical.

Also to produce hybrid sorbent of a U.S. Pat. No. 7,807,606 they use PAN, which does not posses anoinexchange properties. So the described hybrid sorbent is the mechanical mixture of PAN and HFO complex. The absence of anoinexchange groups in the carrier material (PAN) points that cations of iron (III) cannot connect to PAN and described sorbent is the uniform mixture of distributed mechanically HFO particles between PAN which is the significant drawback of the sorbent. So because of the absence of ionexchange groups the sorption of heavy metals is impossible.

Hybrid sorbent for arsenic removal derived according to the method described in the application for a patent US 2007/0241057 (published 18 Oct. 2007, priory date 11 Apr. 2006, InC B01J 20/26, assignee Lanxess Corporation (US)) is known from the state of the art.

To produce the sorbent they use anionexchange polymeric matrix on the base of aromatic hydrocarbons, for example, polyvinyl. Aromatic hydrocarbon, initiating agent and porogen to make anionexchange polymeric matrix macroporous are added into the mixture of the anionexchange polymeric matrix. After anionexchange polymeric matrix is derived they add solution of iron (II) salt or iron (III) salt, which are not capable for complex formation, for example dissoluble iron (III) chlorides, or, for example, air oxygen.

After it the solution of the compound which leads to HFO formation, for example, alkali hydroxide is added. The derived material is put on sieve to remove the extra liquid and is rinsed by distilled water.

According to the U.S. Pat. No. 7,407,587 (published. 5 Aug. 2008, priority 24 Mar. 2006, InC C01B 31/08, C02F 1/42, assignee Layne Christensen Company (US) the hybrid sorbent on the base of anoinexchange resin with HFO and method of its production is known.

The method is the following. The anoinexchange resin is treated with iron (III) salt with further addition of alkali solution to the derived material and final rinsing of the derived material with the distilled water. The iron salt and alkali treatment may be done, at least, in two steps with rinsing between them. On the step of anoinexchange resin treatment by iron salt solution the rinsing is done by sodium chloride, enriched with carbon dioxide, after alkali treatment the rinsing is done by distilled water. Iron (III) chloride, nitrate, acetate may be used as iron (III) salt.

In the end HFO particles, irretrievably fixed on the surface and in pores of anoinexchange resin are formed in the hybrid sorbent produced by the following method.

In U.S. Pat. No. 7,407,587 hybrid sorbent produced by the method described above is capable to sorb anions, containing arsenic As(V) from water. Sorption degree of arsenic As(V) anions increases with the increase of amount of iron in hybrid sorbent. The optimal value of pH of solution for maximum arsenic As(V) removal is 6.

The invention drawback according to the U.S. Pat. No. 7,407,587 is that the hybrid sorbent is not capable to sorb As(III) compounds. It should be noted that size and porosity of HFO particles depend on their formation speed. When alkali hydroxide directly interacts with iron chloride the exchange reaction is nearly immediate, and that leads to quick sedimentation of iron hydroxide and formation of big particles with low porosity. This limits sorbent utilization, as the less the porosity is the smaller is the effective surface area of the sorbent and more amount of sorbent is needed to purify the given volume of water. So the liquid purification device has to be large enough, and it is inconvenient for water purification of water especially in every day life.

According to the U.S. Pat. No. 7,291,578 (published 6 Nov. 2007, priority 21 Jan. 2004, InC B01J 20/26, assignee Amp SenGupta (US)) hybrid sorbent on the base of anoinexchange polymeric matrix with HFO for selective removal of impurities from liquids and method of sorbent production, chosen by the Applicant as the closest analogue. The method of anoinexchange polymeric matrix is the following. Anoinexchange polymeric matrix is enriched, for example, with potassium permanganate or sodium hypochlorite and is rinsed. Then the derived material is treated with iron (II) salt. The oxidation reaction of iron (II) to iron (III) with transfer to HFO from and anion-oxidizer reduction takes place. So the HFO particles are formed and fixed in anoinexchange polymeric matrix structure. Then anoinexchange polymeric matrix with HFO is rinsed and dried.

The Applicant examined the sorbent claimed in the U.S. Pat. No. 7,291,578. Drawbacks of the sorbent and comparative analysis of the closest analogue sorbent and the claimed sorbent are given in Table 1. The drawback of the closest analogue is low sorption capacity to arsenic compounds.

The object of the invention and the technical result achieved with the use of the invention is to develop new hybrid sorbent with HFO with increased sorption kinetics of two arsenic forms As(III) and As(V) simultaneously.

Problem to solve and claimed technical result when using this invention are achieved by that hybrid sorbent on the base of anoinexchange polymeric matrix with HFO for selective arsenic sorption, where HFO is in the matrix in the form of particles which mostly are amorphous ferrihydrite the fraction of which is not less than 80%, predominantly more than 90% of total weight of the HFO. HFO particles have microporous structure and their size ranges from 5 to 500 nm, polymeric matrix may be macroporous fibrous and/or granulated material. The content of aionexchange groups in polymeric matrix is not less than 6.0 mmol/g.

The claimed hybrid sorbent is anoinexchange polymeric matrix with HFO fixed in it. At the same time HFO on hybrid sorbent consists of at least 90% of amorphous ferrihydrite and less than 10% of iron-containing impurities, forming complex of HFO compounds. HFO is microporous particles with size from 5 to 500 nm, formed and fixed directly inside of micropoures of anionexchange material after changeable iron (III) complexes are destructed when treated with alkali metal.

Fibrous or granulated material or their mixture can be used as an anioinexchange material.

So the anioinexchange polymeric matrix may be granulated anioinexchange resin with secondary or tertiary amine groups or anioinexchange polymeric fibers with secondary or tertiary amine groups, and/or mixture of resin and fibers, and anioinexchange group content in polymeric matrix is not less than 6.0 mmol/g.

Complex salt can be complex iron salt, where ligands are oxalate, salicylate, citrate or tartrate. Sodium or potassium hydroxide maybe used as alkali hydroxide.

Production method of hybrid sorbent with HFO is the following. The solution of complex salt, where central ion is the cation of iron (III) and anions of carbon salts are ligands is prepared. The derived solution is added to the anionexchange polymeric matrix for sorption of complex anions on the matrix. After that the derived provisional structure is treated with alkali hydroxide solution till hybrid sorbent is formed, which then is rinsed with water.

The provisional structure is derived during reaction between anionexchange groups of polymeric matrix with anion of complex salt. When provisional structure is treated with alkali hydroxide the unstable complex—amorphous ferrihydrite—in the phase of anionexchange polymeric matrix is formed with its further degrading. As the formation and degrading of the complex takes place in the solution, the degrading is slow, that helps HFO to form on different, parts of polymeric matrix separated from each other, so the HFO particles are finer. In such conditions during alkali hydroxide removal FIFO structure consolidates more slowly, providing big amount of micropores in HFO particles. Sorption properties of HFO particles, as well as their composition depend on their size and porosity. The smaller is the size of the particles and higher is their porosity, the bigger is the contact area of the sorbing compound with HFO surface, and so the bigger is the sorption capacity. The bigger is the sorption capacity, the less amount of sorbent is required to purify the given volume of water, that widens the opportunities of sorbents practical use.

According to given invention hybrid sorbent has high sorption properties towards arsenic compounds of two forms As(III) and As(V), in particular towards oxo anions in wide range of pH, arsenate ions and non-dissociated arsenites. At the same time hybrid sorbent is capable for effective sorption of toxic anions of chrome Cr(VI), and also cations and hydroxocations of copper and lead. Hybrid sorbent has high sorption kinetics, that increases linear velocity of water flow in sorption column. That is important for practical use, as it helps to provide the filtration velocity convenient for the user without efficiency loss.

EXAMPLES OF HYBRID SORBENTS ACCORDING TO CLAIMED INVENTION

Example 1

Figure 1:
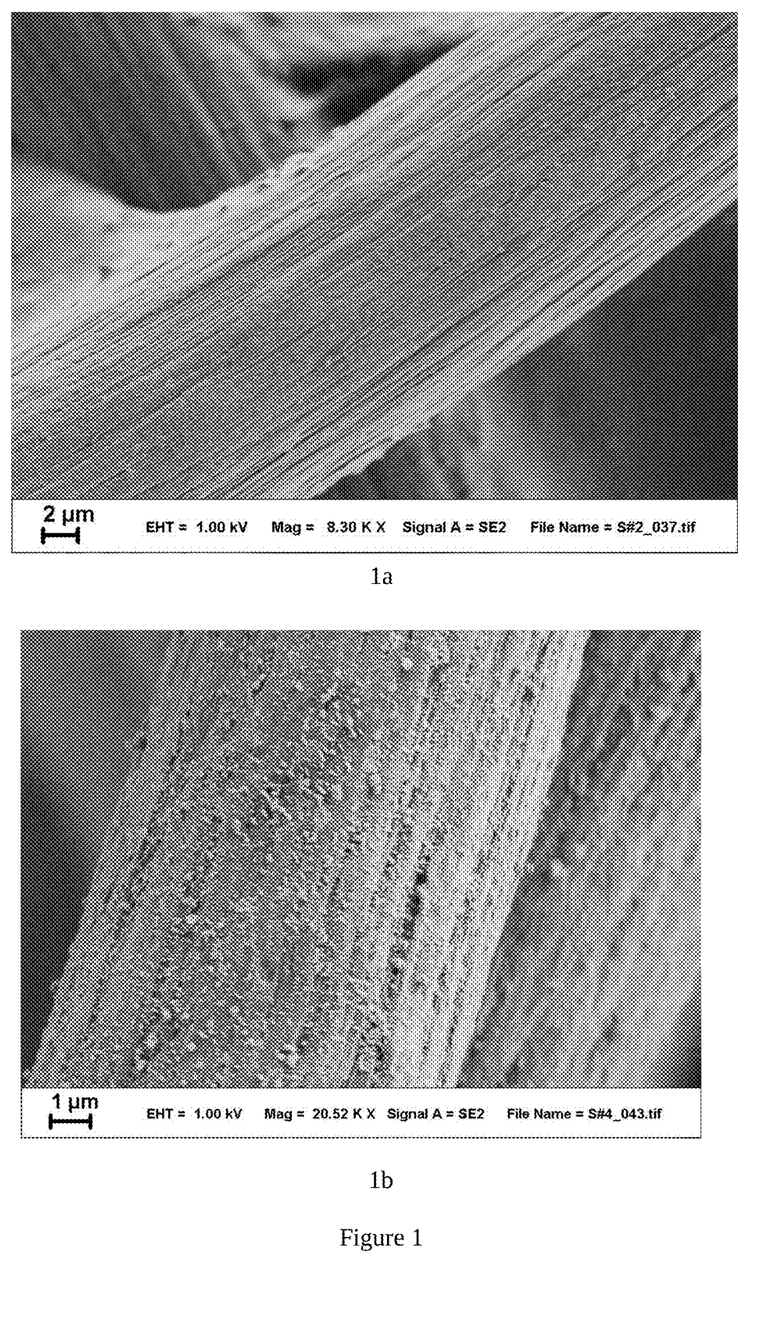
FIG. 1. Electronic microphotography of the initial anoinexchange polymeric fiber (1a). Electronic microphotography of the hybrid sorbent on the base of anoinexchange PAN-fiber with HFO (1б).

Base—macoporous fiber material—anion exchange on the base ob PAN-fiber with anion exchange groups content 8.6 mml/g.
The ferrihydrate content in hybrid sorbent is 98%.
The particle size of HFO, in particular ferrihydrate is—from 80 to 140 nm.
Iron (III) content in hybrid sorbent—63 mg of iron to 1 g of sorbent.
Sorption capacity of As(V)—32 mg/g (at pH 7).
Sorption capacity of As(III)—30 mg/g (at pH 7).
Sorption kinetics of As(V)—semi-sorption time less then 1 min.
Removal kinetics of As(III)—semi-sorption time 1 min.
Sorption capacity of Cr(VI)—250 mg/g (at pH 7).
Sorption capacity of Cu—240 mg/g.
Sorption capacity of Pb—360 mg/g.
Electronic microphotography of initial anionexchange polymeric fiber (1a), used to produce hybrid sorbent in example 1 is given in the FIG. 1. On the second electronic microphotography (1b) hybrid sorbent on the base of anionexchange polymeric fiber with HFO, produced according to method, described in claimed method is given. On the microphotography (1b) particles HFO are sharply visible on the fiber surface.

Example 2

Base—macoporous granulated material—anionexchange resin.
The ferrihydrate content in hybrid sorbent is 92%.
The particle size of HFO, in particular ferrihydrate—from 50 to 120 nm.
Anionexchange groups content in hybrid—9 mmol/g.
Iron (III) content in hybrid sorbent—72 mg/g.
Sorption capacity of As (V)—44 mg/g (at pH 7).
Sorption capacity of As (III)—34 mg/g (at pH 7).
Removal kinetics of As (V)—semi-sorption time 25 min.
Removal kinetics of As (III)—semi-sorption time 30 min.
Sorption capacity of Cr (VI)—300 mg/g (at pH 7).
Sorption capacity of Cu—270 mg/g.
Sorption capacity of Pb—180 mg/g.

Example 3

Base—mixture of macroporous fiber and granulated material 1:8 respectively.
The ferrihydrate content in hybrid sorbent is 93%.
The particle size of HFO, in particular ferrihydrate—from 50 to 140 nm.
Anion exchange group content in hybrid sorbent—8.95 mmol/g.
Iron (III) content in hybrid sorbent—71 mg/g.
Sorption capacity of As (V)—42 mg/g (at pH 7).
Sorption capacity of As(III)—36 mg/g (at pH 7).
Removal kinetics of As(V)—semi-sorption time 1.5 min.
Removal kinetics of As(III)—semi-sorption time 4 min.
Sorption capacity of Cr (VI)—295 mg/g (at pH 7).
Sorption capacity of Cu—265 mg/g.
Sorption capacity of Pb—200 mg/g.

Figure 2:
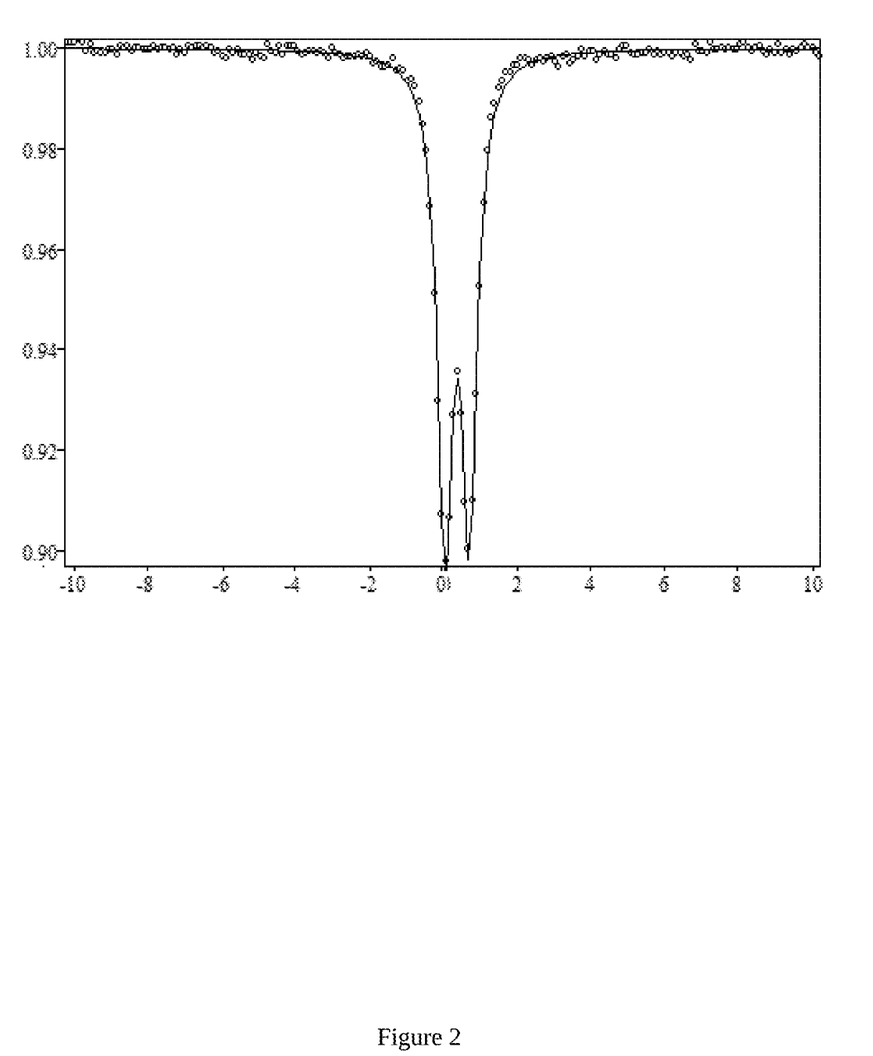
FIG. 2. Mossbauer spectrum of the sample of hybrid sorbent on the base of anoinexchange PAN-fiber with HFO, described in example 1.

HFO type in the hybrid sorbent phase, described in examples 1-3 was determined by Mossbauer spectroscopy and is given in the FIG. 2.

Mossbauer spectrum of hybrid sorbent on the base of anionexchange polymeric PAN-fiber with HFO of example 1 is given in the FIG. 2. From the spectrum one can see that HFO in the hybrid sorbent sample of example 1, produced according to the claimed method, has more that 90% of ferrihydrite $Fe_2O_3.3FeO(OH).3H_2O$.

Figure 3:
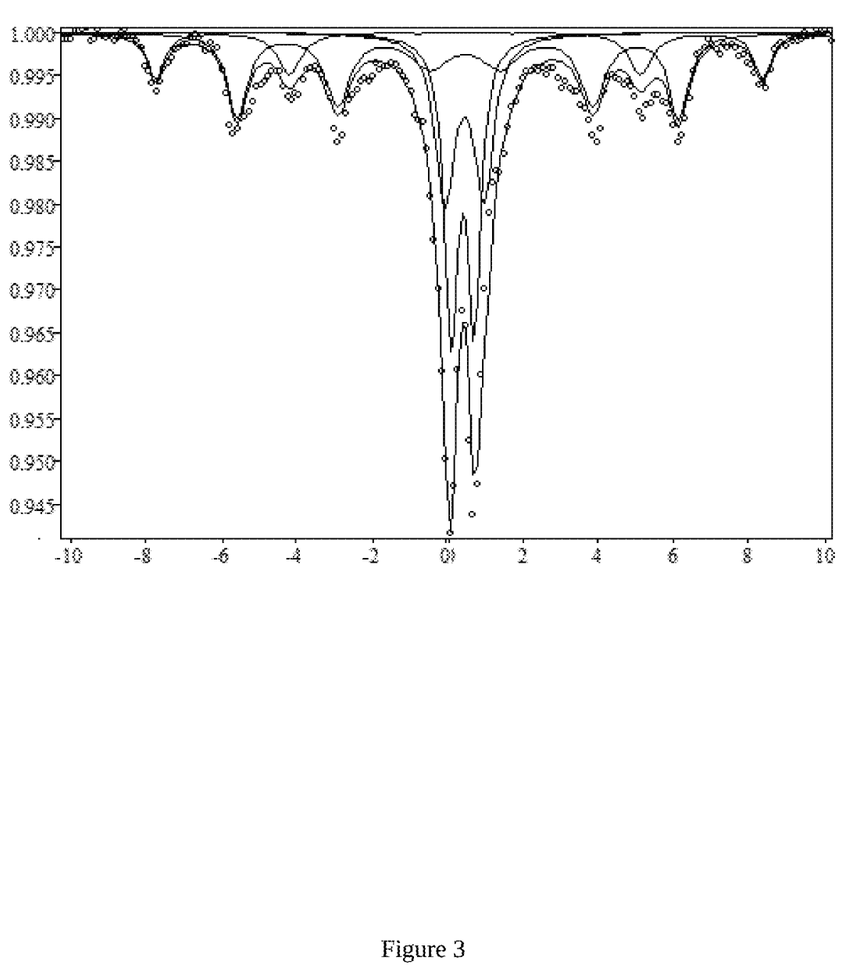
FIG. 3. Mossbauer spectrum of the sample of hybrid sorbent of U.S. Pat. No. 7,291,578.

Also HFO type of hybrid sorbent sample of the U.S. Pat. No. 7,291,578 (the closest analogue) was determined by Mossbauer spectroscopy (FIG. 3). The spectrum shows that HFO consists of magnetic crystalline particles, including 23% wustite FeO, 28% ferrihydrite $Fe_2O_3 \cdot 3FeO(OH) \cdot 3H_2O$, 13% hematite $\alpha$-$Fe_2O_3$ и 36% lepidocrocite $\gamma$-FeO(OH).

From the information given above it is seen that HFO in hybrid sorbent sample consists of 90% of amorphous ferrihydrite. At the same time hybrid sorbent of the closest analogue U.S. Pat. No. 7,291,578 consists of ferrihydrite on 28%. This once more consolidates sorption abilities of invention in comparison to closest analogue.

The soption kinetic diagram of arsenic As (III) by hybrid sorbent on the base of PAN-fiber with HFO, described in example 1, soption kinetic diagram of arsenic As (III) by hybrid sorbent on the bae of mixture of PAN-fiber and ionexchange resin, described in the example 3, and also soption kinetic diagram of arsenic As (III) by hybrid sorbent FO36 U.S. Pat. No. 7,291,578, chosen as the closest analogue are depicted in the in the FIG. 4.

The soption kinetic diagram of arsenic As (V) by hybrid sorbent on the base of PAN-fiber with HFO, described in example 1, soption kinetic diagram of arsenic As (V) by hybrid sorbent on the base of mixture of PAN-fiber and ionexchange resin, described in the example 3, and also soption kinetic diagram of arsenic As (V) by hybrid sorbent FO36 U.S. Pat. No. 7,291,578, chosen as the closest analogue are depicted in the in the FIG. 5.

Figure 4:
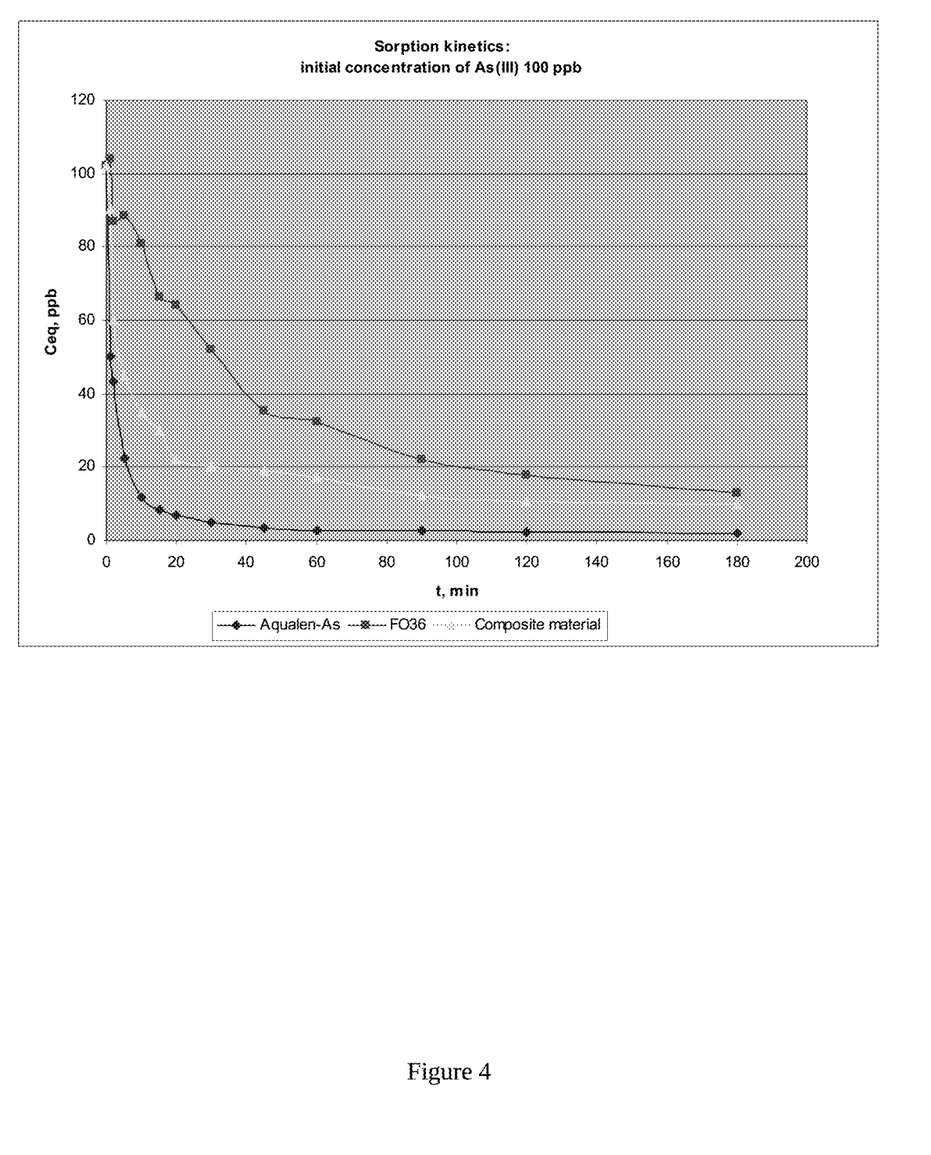
FIG. 4. Sorption kinetic diagram of arsenic As(III) by hybrid sorbent with HFO on the base of PAN-fiber, described in example 1, sorption kinetic diagram of arsenic As(III) by hybrid sorbent with HFO on the base of PAN fiber and ionexchange resin, described in the example 3 and sorption kinetic of arsenic As(III) by hybrid sorbent of a U.S. Pat. No. 7,291,578 (trade name FO36), chosen by the applicant as the closest analogue.
Figure 5:
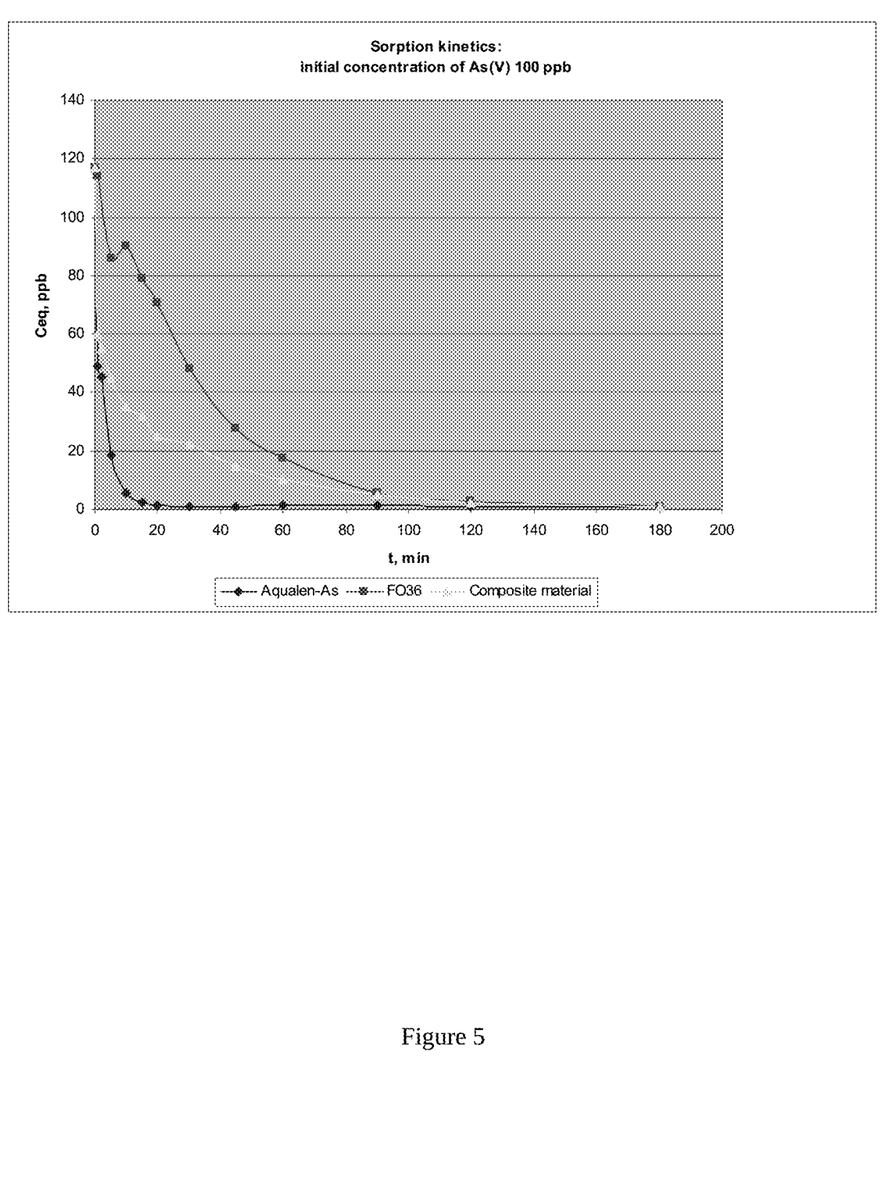
FIG. 5. Sorption kinetic diagram of arsenic As(V) by hybrid sorbent with HFO on the base of PAN-fiber, described in example 1, sorption kinetic diagram of arsenic As(V) by hybrid sorbent with HFO on the base of PAN fiber and ionexchange resin, described in the example 3 and sorption kinetic of arsenic As(V) by hybrid sorbent FO36 of a U.S. Pat. No. 7,291,578, chosen by the applicant as the closest analogue.

From the diagrams depicted in the FIGS. 4 and 5 it is obvious that hybrid sorbent with HFO on the base of PAN-fiber, described in the example 1 of the invention has the highest sorption kinetics of arsenic As(III) and As(V), particularly: kinetics of 50-percent sorption of As(III) is 1 minute, kinetics of 50-percent sorption of As(V) is less than 1 minute. Sorption kinetics of As(III) and As(V) of hybrid sorbent on the base of a mixture of PAN-fiber and ionexchange resin, described in example 3 is lower: kinetics of 50-percent sorption of As(III) is 4 minutes and kinetics of 50-percent sorption of As(V) is less 1.5 minutes. At the same time hybrid sorbent of a U.S. Pat. No. 7,291,578, chosen by the applicant as the closest analogue has sorption kinetics less than hybrid sorbent in example 3, particularly 50-percent sorption kinetics of ions As(III)—30 minutes and As(V)—25 minutes.

Comparative analysis of hybrid sorbent of the closest analogue (U.S. Pat. No. 7,291,578) and claimed hybrid sorbent with HFO is given in table 1.

Sorption kinetics of As(III) was determined with sodium meta arsenite $NaAsO_2$, and sorption capacity of As(V) was determined with 12-aqua sodium orto arsenate $Na_3AsO_4 \cdot 12H_2O$.

TABLE 1

Comparative analysis of hybrid sorbent of the closest analogue (U.S. Pat. No. 7,291,578) and claimed hybrid sorbent with HFO.

| Material | Closest analogue U.S. Pat. No. 7,291,578 | Claimed |
|---|---|---|
| Iron content in hybrid sorbent, mg/g | 35-60 | 60-110 |
| HFO type in sorbent phase | 23% wustite 28% ferrihydrate 13% hematite 35% lepidocrocite crystalline structure prevails | >90% ferrihydrate amorphous structure |
| Necessity of mechanical grinding of HFO units HFO | — | — |
| Sorption kinetics of As(V), mg/g | 22 | 32 |
| Sorption capacity of As(III), mg/g | 17 | 30 |
| Kinetics 50% removal As(V)/As(III), min | 25/30 | <1/1 |
| Sorption capacity of Cr (VI), mg/g | — | 250 |
| Sorption capacity of Cu, mg/g | | 250 |
| Sorption capacity of Pb, mg/g | | 360 |
| Suggested linear velocity of water filtration, m/h | 30 | 130 |
| Minimal height of sorbent layer in column, mm | 1000 | 100 |

As can be seen form the data indicated in table 1, sorption capacity of the claimed hybrid sorbent far exceeds the sorption capacity of hybrid sorbent of the closest analogue (U.S. Pat. No. 7,291,578), and also sorbents, described in state of the art. It is explained, that in hybroid sorbent with HFO claimed in the invention, the amorphous ferruhydrate fraction in HFO exceeds 90%. As ferrihydrate functional groups due to its amorphous structure are more available for anions, containing arsenic As(III) and As(V), then structures of crystalline magnetic HFO in hybrid sorbents in the state of the art, they have the highest sorption activity towards As(III) and As(V) ions, as well as to different ions of heavy metals such as Cr(VI), Cu and Pb.

As can be seen from the information indicated above from the complex of compounds of HFO, only amorphous ferrihydrate $Fe_2O_3 \cdot 3FeO(OH) \cdot 3H_2O$ has the highest activity of sorption to both arsenic ions As(III) and As(V), and hybrid sorbent is additionally capable to sorb different ions of heavy metals. The given comparative analysis prove that claimed hybrid sorbent with HFO, in which HFO contains more than 90% from amorphous ferrihydrite is highly active and stable sorbent towards ions of both arsenic As(III) and As(V).

In the description of the invention the preferable embodiment is given. The invention maybe changed, but within the limits of the present claims. This gives the possibility of its common use.

The invention claimed is:

1. Hybrid sorbent comprising:
a base of anion exchange polymeric matrix; and
an HFO for selective sorption of arsenic characterized in that, the HFO exists in said matrix as particles comprising primarily amorphous ferrihydrate, a fraction of said amorphous ferrihydrate being more than 90% from a total mass of the HFO.

2. Hybrid sorbent according to claim 1, characterized in that the HFO particles have a microporous structure and their size varies from 5 to 500 nm.

3. Hybrid sorbent according to claim 1, characterized in that the anion exchange polymeric matrix comprises macroporous fiber.

4. Hybrid sorbent according to claim 1, characterized in that an anion exchange content in the anion exchange polymeric matrix is not less than 6.0 mmol/g.

5. Hybrid sorbent according to claim 1, characterized in that the anion exchange polymeric matrix comprises a granulated material.

* * * * *